US008732668B2

(12) United States Patent
Klemenz et al.

(10) Patent No.: US 8,732,668 B2
(45) Date of Patent: May 20, 2014

(54) SYSTEM AND METHOD OF ERROR HANDLING IN A PLATFORM AS A SERVICE ENVIRONMENT

(75) Inventors: Oliver Klemenz, Heidelberg (DE); Daniel Goldmann, Mannheim (DE)

(73) Assignee: SAP AG, Walldorf (DE)

( * ) Notice: Subject to any disclaimer, the term of this patent is extended or adjusted under 35 U.S.C. 154(b) by 192 days.

(21) Appl. No.: 13/284,074

(22) Filed: Oct. 28, 2011

(65) Prior Publication Data

US 2013/0111277 A1 May 2, 2013

(51) Int. Cl.
*G06F 9/44* (2006.01)

(52) U.S. Cl.
USPC ............ 717/125; 717/105; 717/109; 717/113

(58) Field of Classification Search
USPC .................................................. 717/124–135
See application file for complete search history.

(56) References Cited

U.S. PATENT DOCUMENTS

| | | | |
|---|---|---|---|
| 6,052,525 A * | 4/2000 | Carlson et al. ................. 717/100 |
| 7,917,815 B2 * | 3/2011 | Rapp et al. ....................... 714/57 |
| 8,380,549 B2 * | 2/2013 | Haeberle et al. .................. 705/28 |
| 2005/0021536 A1 * | 1/2005 | Fiedler et al. ................... 707/100 |
| 2006/0070083 A1 * | 3/2006 | Brunswig et al. ............. 719/318 |
| 2006/0225032 A1 * | 10/2006 | Klerk et al. .................... 717/105 |
| 2008/0126409 A1 * | 5/2008 | Weber et al. ................ 707/104.1 |
| 2008/0141237 A1 * | 6/2008 | Elad et al. ....................... 717/171 |
| 2008/0262860 A1 * | 10/2008 | Schneider et al. ................. 705/1 |
| 2010/0001834 A1 * | 1/2010 | Brunswig et al. ............. 340/7.51 |
| 2010/0057504 A1 * | 3/2010 | Baeuerle et al. .................. 705/7 |
| 2010/0057776 A1 * | 3/2010 | Baeuerle et al. ........... 707/104.1 |
| 2010/0058113 A1 * | 3/2010 | Rapp et al. ....................... 714/38 |
| 2010/0131916 A1 * | 5/2010 | Prigge ............................ 717/104 |
| 2010/0162147 A1 * | 6/2010 | Ritter et al. .................... 715/764 |
| 2010/0250648 A1 * | 9/2010 | Cao et al. ....................... 709/203 |
| 2010/0251129 A1 * | 9/2010 | Beringer et al. .............. 715/738 |
| 2011/0185282 A1 * | 7/2011 | Mahmood et al. ............ 715/744 |
| 2011/0307404 A1 * | 12/2011 | Wickel et al. .................. 705/331 |
| 2011/0307405 A1 * | 12/2011 | Hammer et al. ............... 705/331 |
| 2012/0158798 A1 * | 6/2012 | Patil ............................... 707/810 |
| 2012/0159446 A1 * | 6/2012 | Jentsch et al. ................. 717/124 |
| 2013/0031116 A1 * | 1/2013 | Klemenz ....................... 707/756 |
| 2013/0031127 A1 * | 1/2013 | Klemenz ....................... 707/769 |
| 2013/0111277 A1 * | 5/2013 | Klemenz et al. ................. 714/57 |

OTHER PUBLICATIONS

U.S. Appl. No. 13/194,263, filed Jul. 29, 2011, Klemenz.
Markus Heller and Matthias Allgaier, "Model-Based Service Integration for Extensible Enterprise Systems with Adaptation Patterns," 5th International Conference on E-Business (ICE-B 2010), Jul. 2010.

(Continued)

*Primary Examiner* — Don Wong
*Assistant Examiner* — Marina Lee
(74) *Attorney, Agent, or Firm* — Fountainhead Law Group PC

(57) ABSTRACT

A system and method of improving error handling in a development environment created by a platform provider in which a third party developer develops applications for use by customers The method includes storing business objects and error messages, where the error messages corresponds to potential errors during run time processing of the plurality of business objects. The method further includes receiving a first user input regarding an error situation, where the error situation includes a resolution of the error situation, and receiving a second user input that associates the error situation with a sub-subset of a subset of the error messages. In this manner, the usability of the platform is improved.

30 Claims, 8 Drawing Sheets

(56) References Cited

OTHER PUBLICATIONS

Matthias Allgaier, "Requirements for a Recommendation System Supporting Guided Service Integration Modelling in Extensible Enterprise Systems," In: W. Esswein, J. Juhrisch, M. Nuttgens, K. Turowski (eds): Proc. Modellierung, betrieblicher Informationsysteme (MOBIS'10) E=CEUR Online Proceedings, Germany, 2010.

* cited by examiner

SYSTEM AND METHOD OF ERROR HANDLING IN A PLATFORM AS A SERVICE ENVIRONMENT

CROSS REFERENCE TO RELATED APPLICATIONS

Not applicable.

BACKGROUND

1. Field of the Invention

The present invention relates to error handling, and in particular, to error handling in a platform as a service (PaaS) environment.

2. Description of the Related Art

Unless otherwise indicated herein, the approaches described in this section are not prior art to the claims in this application and are not admitted to be prior art by inclusion in this section.

Cloud computing and software as a service (SaaS) concepts have been increasingly deployed. Extending these concepts is the concept of the platform as a service (PaaS). In general, the PaaS provides the underlying technology for developing and executing various types of SaaS. In a PaaS, the platform provider provides the building blocks for applications, and may also provide complete applications (for example, to cover common customer needs, to illustrate best practices, etc.) Third party developers then use the building blocks to modify existing applications or to create new applications to meet customer needs. A vibrant third party developer community contributes to the success of the platform.

Platforms are not without their drawbacks. The interactions between the building blocks must be configured rigorously. For example, the applications of Developer 1 will not only have to work properly with the platform itself, but also with those of Developer 2, as well as integrating with any other external systems allowed by the platform.

One area where the drawbacks are evident is with error handling. For each building block, the developer needs to configure it to work properly in the event of any of the possible types of errors resulting from any of the possible interactions with other building blocks. Depending upon the platform, this can be a time consuming task.

For example, consider the SAP Business ByDesign platform, which includes a Metadata Repository System (MDRS) and a Process Agent Framework (PAF). The MDRS stores metadata used by the platform. The PAF provisions a framework to support the communication via web-services based on entities, also referred to as Process Agents. One feature of PAF is the support of error handling during Process Agent processing. PAF has runtime and design time parts. The design time parts are mostly modeled in MDRS, but unfortunately the error handling part is not in MDRS, but is placed in a different storage. Thus, to implement a Process Agent the developer needs to model in MDRS and to code the runtime according to PAF rules. To configure the error handling, PAF provides design time tools for this.

In addition, if the building block uses processor determination, the developer needs to implement the processor determination logic in ABAP (Advanced Business Application Programming) code.

SUMMARY

Given the above background, there is a need to improve the efficiency of configuring error handling for the developers; especially in a PaaS environment for which attracting and maintaining a rich developer community is an important component of what makes a platform successful. An embodiment of the present invention is directed toward improving error handling in a platform environment.

One embodiment is a method of improving error handling in a development environment created by a platform provider in which a third party developer develops applications for use by customers. The method includes storing business objects and error messages, where the error messages are associated with the business objects, and where the error messages corresponds to potential errors during run time processing of the business objects. The method further includes displaying, in a graphical environment, a business object and a subset of the error messages, where the subset is related to the business object. The method further includes receiving a first user input regarding an error situation, where the error situation includes a resolution of the error situation. The method further includes receiving a second user input, in the graphical environment, that associates the error situation with a sub-subset of the subset of error messages. The method further includes storing information that associates the error situation with the sub-subset for the business object. In this manner, the usability of the platform is improved.

The method may include automatically generating, by the development environment, code that relates the error situation with the sub-subset of the subset of error messages.

The method may include automatically accessing, by the development environment, a plurality of entities that relates the error situation with the sub-subset of the subset of the plurality of error messages.

The information that associates the error situation with the sub-subset for the business object may be stored during a design time. The method may include performing runtime processing of the business object that results in an error, and resolving the error according to the error situation.

The method may include exiting the development environment, entering a runtime environment, performing runtime processing, in the runtime environment, of the business object that results in an error, and resolving the error according to the error situation.

The method may include displaying a second business object and a second subset of error messages, where the second subset differs from the subset. The method may further include receiving a third user input that associates the error situation with a second sub-subset of the second subset of error messages.

The error situation may be one of many error situations, where the first user input includes selecting the error situation from the many error situations.

The first user input may correspond to many first user inputs that create many error situations.

The second user input may correspond to dragging and dropping the sub-subset to associate the sub-subset with the error situation.

The sub-subset may include two or more error messages that are resolved by the error situation.

A computer system may operate to implement the method described above. The computer system may store, execute or be otherwise controlled by one or more computer programs that control the computer system to implement the method described above.

A non-transitory computer readable medium may store instructions to control a computer system to perform the method described above. The instructions may include an application component, a development client component, and a database component. These components may control hardware components to implement the method described above.

The following detailed description and accompanying drawings provide a better understanding of the nature and advantages of the present invention.

DETAILED DESCRIPTION

Described herein are techniques for error handling. In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include modifications and equivalents of the features and concepts described herein.

In this document, various methods, processes and procedures are detailed. Although particular steps may be described in a certain sequence, such sequence is mainly for convenience and clarity. A particular step may be repeated more than once, may occur before or after other steps (even if those steps are otherwise described in another sequence), and may occur in parallel with other steps. A second step is required to follow a first step only when the first step must be completed before the second step is begun. Such a situation will be specifically pointed out when not clear from the context. A particular step may be omitted; a particular step is required only when its omission would materially impact another step.

In this document, the terms "and", "or" and "and/or" are used. Such terms are to be read as having the same meaning; that is, inclusively. For example, "A and B" may mean at least the following: "both A and B", "only A", "only B", "at least both A and B". As another example, "A or B" may mean at least the following: "only A", "only B", "both A and B", "at least both A and B". When an exclusive-or is intended, such will be specifically noted (e.g., "either A or B", "at most one of A and B").

In this document, various computer-implemented methods, processes and procedures are described. It is to be understood that the various actions (receiving, storing, sending, communicating, displaying, etc.) are performed by a hardware device, even if the action may be authorized, initiated or triggered by a user, or even if the hardware device is controlled by a computer program, software, firmware, etc. Further, it is to be understood that the hardware device is operating on data, even if the data may represent concepts or real-world objects, thus the explicit labeling as "data" as such is omitted. For example, when the hardware device is described as "storing a record", it is to be understood that the hardware device is storing data that represents the record.

Figure 1:
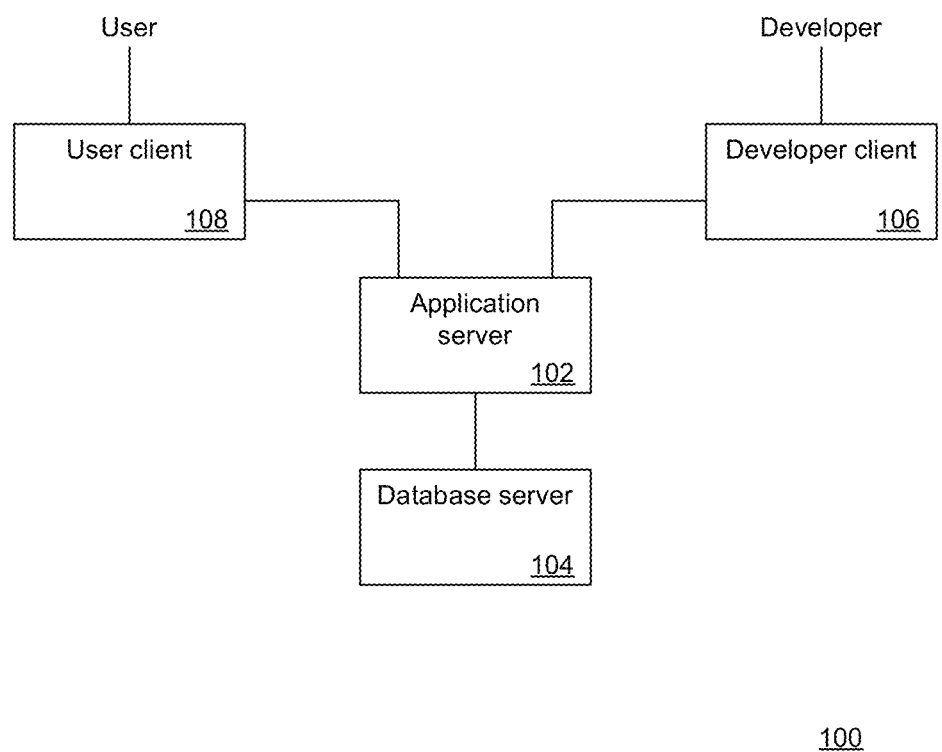
FIG. 1 is a block diagram of an application platform system according to an embodiment.

FIG. 1 is a block diagram of an application platform system 100 according to an embodiment. The application platform system 100 includes an application server 102, a database server 104, a developer client 106, and a user client 108. The application platform system 100 is arranged in a three tier architecture, including a database tier (the database server 104), an application tier (the application server 102; see also FIG. 2), and a presentation tier (the user client 108). An example of the specific hardware used to implement these devices can be seen in FIG. 8. Note that only one computing device of each type is shown, but more than one device of a particular type may be present in other embodiments. Further note that both the developer client 106 and the user client 108 may not be present; generally the developer client 106 is present during development of the applications, and the user client 108 is present during execution of the applications.

The application server 102 generally implements the PaaS. As such, the application server 102 may be one of a number of virtualized servers implemented on a number of computing devices. For example, a particular customer may contract for a defined amount of PaaS capacity. If the contracted capacity is small, the application server 102 may be virtualized by a single computing device, even as one of a number of other application servers implemented by that computing device. If the contracted capacity is large, the application server 102 may be virtualized over many computing devices. During development, the application server 102 implements the development environment. During deployment, the application server 102 implements the runtime environment. (More generally, the application tier itself will often include many application servers associated with many customers and with many developers, in various stages of development, configuration, deployment and usage.) Most of the remaining discussion below concerns the development environment.

The database server 104 generally performs persistent storage for the application server 102. During development, the database server 104 may store the building blocks (e.g., business objects), the rules for implementing the development environment, and the custom applications (e.g., add-ons) developed. During deployment, the database server 104 may store the custom applications and the related data (e.g., business object instances).

The developer client 106 generally provides a user interface for the developer to develop custom applications in the development environment. For example, the developer may develop an add-on to print a specific type of report.

The user client 108 generally provides a user interface for the user to use the applications executing in the runtime environment. For example, the user may request the system 100 to generate a selected report using data in a specified date range.

Figure 2:
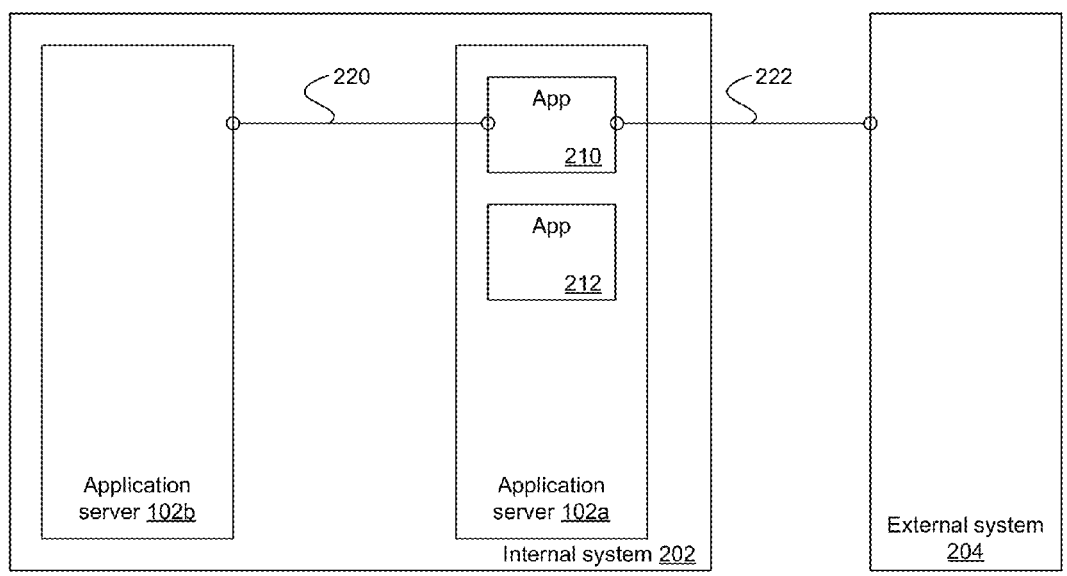
FIG. 2 is a block diagram that illustrates more details of the application tier 200 as related to error handling.

FIG. 2 is a block diagram that illustrates more details of the application tier 200 as related to error handling. The application tier 200 includes an application server 102a, an application server 102b, an internal system 202, and an external system 204. As discussed above, the application tier 200 and its components may be virtualized over one or more computing devices. The platform provider provides the internal system 202, and does not provide the external system 204.

The internal system 202 generally implements the PaaS. As discussed above, the PaaS provides a platform for the SaaS. The application servers 102a and 102b generally implement the SaaS. The internal system 202 may also include other application servers (as discussed above). The application server 102a implements the SaaS for a particular customer. The application server 102a implements a number of applications, of which are shown the applications 210 and 212.

The external system 204 generally implements additional functionality not provided by the internal system 202, outside the control of the platform provider. As such, the platform provider may configure the internal system 202 to interact with the external system 204 via various defined interfaces. Examples of the external system 204 include an email system (e.g., Microsoft Exchange server), a Google Apps system (e.g., Google Docs), an Amazon Web Services system (e.g., Amazon EC2, Amazon S3), etc.

The error handling cases that are detailed below relate to the interaction 220 between the application 210 and the application server 102b, and the interaction 222 between the application 210 and the external system 204. The interaction 220 may also be referred to as internal process integration or application to application integration (A2A). The interaction 222 may also be referred to as external process integration, business to business (B2B) integration, or third party A2A integration.

The application 210 may have other interactions, for which the error handling cases are not further elaborated. These other interactions include interactions with the application server 102b, for example internal XDU (cross deployment unit) queries, also referred to as A2X consumption. These other interactions also include interactions with peripheral output devices, for example printers. These other interactions also include interactions with the PaaS environment, referred to as local integration or local client proxy (LCP). These other interactions also include interactions with the external system 204, for example lightweight web services (WS) consumption and WS provisioning (also referred to as A2X). In addition, the internal system 202 may itself have interactions with the external system 204, for example business events.

As a specific implementation example, the PaaS implemented by FIG. 2 may be a SAP Business ByDesign environment. The internal system 202 corresponds to the ByDesign system, which is implemented by SAP as the platform provider. The external system 204 is not provided by the platform provider. The application servers 102a and 102b may be referred to as Deployment Units (DUs). The applications 210 and 212 may be referred to as Partner Add-Ons (AOs).

In general, the interaction 220 describes an internal web service communication between two deployment units (e.g., application servers 102a and 102b) in one ByDesign system (e.g., the internal system 202). As the call stays in one system, a local shortcut configuration is in place. The communication is asynchronous and exchanged data is XML based. Error handling can be easily performed as both sides are known to the runtime execution.

In general, the interaction 222 describes an external web service communication between a deployment unit (e.g., the application server 102a) and an external communication system (e.g., the external system 204). Error handling cannot be easily performed because the external system is not provided by the platform provider.

Regarding the other interactions, these are generally synchronous communications. The error handling is performed synchronously, raising exceptions directly to the caller.

Figure 3:
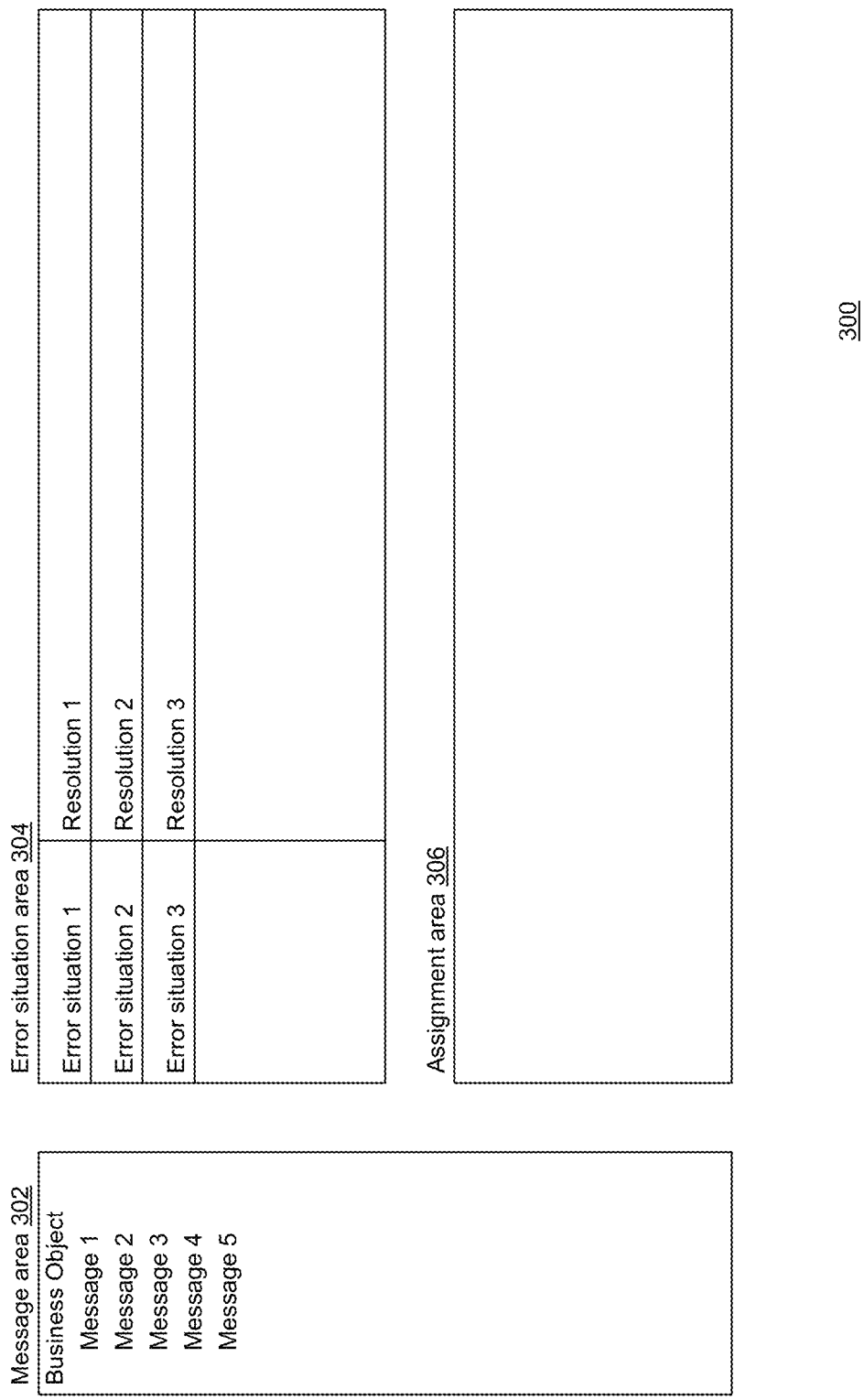
FIG. 3 is an illustration of a graphical interface 300 according to an embodiment.

FIG. 3 is an illustration of a graphical interface 300 according to an embodiment. The graphical interface 300 is used to configure the error handling and may be displayed by the developer client 106 (see FIG. 1) during application development, via interaction with the development environment implemented by the application server 102. The graphical interface 300 includes a message area 302, an error situation area 304, and an assignment area 306.

The message area 302 displays a business object and all the types of error messages that the business object can generate. The business object may generate these errors during run time processing (e.g., when the user is using the user client 108 to interact with the AO executed by the application server 102). A typical business object has many types of error messages, often around 200 types. The error messages can relate to data entered into an instance of the business object (e.g., a start date is empty); to a relationship between items of data (e.g., the start date is later than the end date); to actions performed (e.g., a particular type of button is not enabled); etc.

The error situation area 304 displays error situations and resolutions for the error situations. The resolutions describe how to resolve the error situations. A particular error situation may be defined to cover one or more error messages. For example, a business object may have two error messages, one that occurs when a first start date is after a first end date, and another that occurs when a second start date is after a second end date. Both of those error messages may be covered by a single error situation and resolution (e.g., "switch the start date and the end date").

In general, the developer writes the resolution as instructions for the user to follow when the user encounters the error during run time processing of the business object. This allows the partner to extend the error handling capabilities of the applications executed by the platform without requiring input from, or oversight by, the platform provider. This capability improves the usability of the platform and enhances the PaaS environment. More specifically, this capability improves the usability of the platform because the users (e.g., via the user client 108) are actively informed about erroneous communications. The user is notified with tasks (according to the resolution from the developer) and can resolve the issue to get the system working again. In principle this makes the system more robust, manageable, and user-friendly. In addition, error handling serves to the get the communication line running again, so that subsequent messages can be processed as well.

The assignment area 306 is used to associate error messages (from the message area 302) with error situations (from the error situation area 304). For a selected error situation, the developer may drag error messages from the message area 302 and drop them in the assignment area 306. For example (continuing from above), the developer drags the two date error messages to the assignment area 306 to associate them with the defined error situation.

The developer may also add variables of the error messages dragged into the assignment area. More specifically, error handling is based on messages raised by business objects during inbound communication processing. These BO messages may have additional data, referred to as the variables. These variables are accessible to the BO messages and can be taken over to the task description entered as part of the resolution in an error handling dialog area of the error situation area 304.

Figure 4:
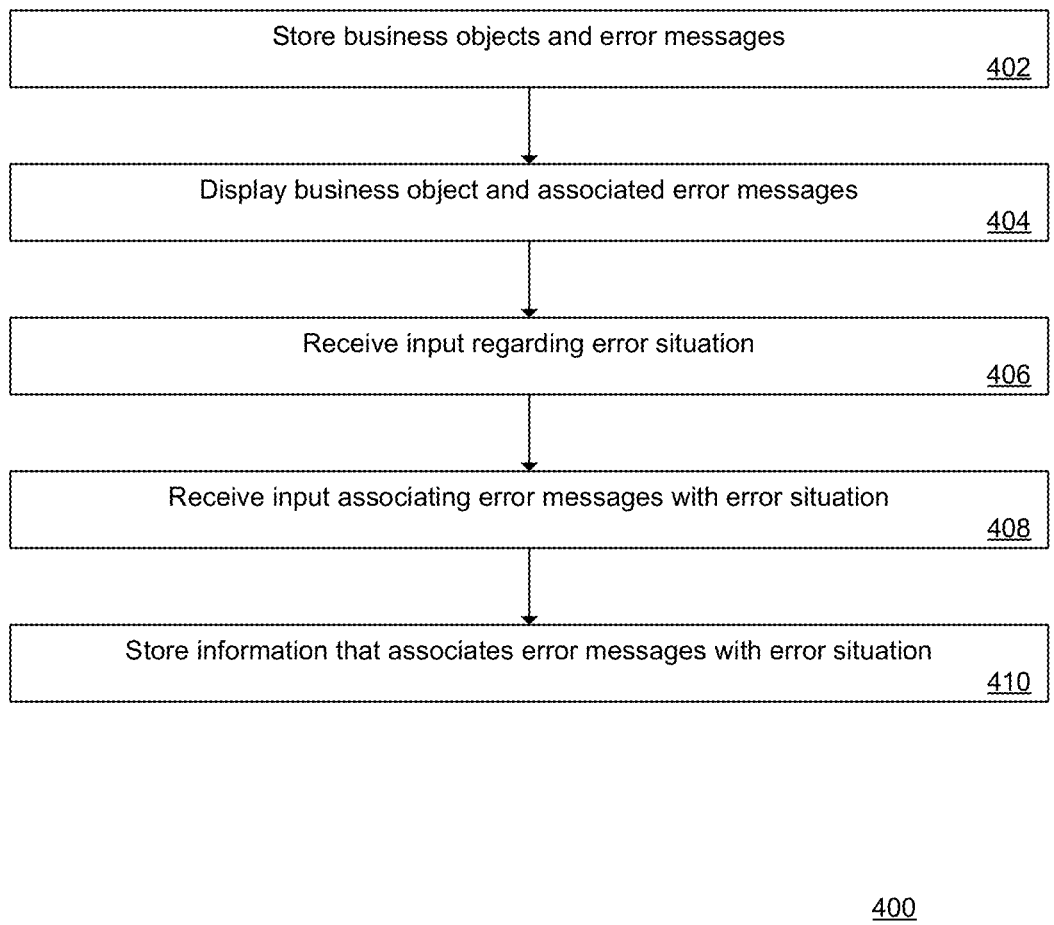
FIG. 4 is a flowchart of a method 400 of improving error handling in a PaaS environment.

FIG. 4 is a flowchart of a method 400 of improving error handling in a PaaS environment. The method 400 may be implemented as one or more computer programs executed by the application server 102 (see FIG. 1), interacting with the developer client 106. In general, the method 400 describes the usage of the graphical interface 300 (see FIG. 3).

At 402, a computer system stores a number of business objects and a number of error messages. The error messages are associated with the business objects and correspond to potential errors during run time processing of the business objects. For example, the database server 104 (see FIG. 1) stores the business objects (and the error messages associated therewith) used in the PaaS development environment, as implemented by the application server 102.

At 404, the computer system displays a business object and its associated error messages. These error messages are a "subset" of the total set of error messages stored by the system (see 402). For example, the development client 108 displays a selected business object and its associated error messages in the message area 302 (see FIG. 3).

At 406, the computer system receives user input regarding an error situation. The error situation includes a resolution of the error situation. For example, the error situation area 304 (see FIG. 3) may initially be empty, so the developer creates a new error situation, giving it a name and describing how the error situation is resolved. The developer may create multiple error situations. The developer may select one of the error situations with which the error messages are to be associated (see 408).

At 408, the computer system receives user input that associates the error situation with one or more of the error messages associated with the business object (see 404). For example, for a selected error situation (see 406), the developer drags one or more (a "sub-subset") of the error messages displayed in the message area 302 (the "subset" of the error messages that are associated with the business object) and drops it in the assignment area 306.

Once the error messages have been associated with the error situation, the computer system performs a number of generation steps relating to activation of the file describing the communication that contains the error handling. These generation steps involve the creation of MDRS objects, configuration generation, error handling configuration, persistency generation, and code generation/configuration to execute communication processing and error handling at runtime.

In addition, the computer system configures the involved entities that are impacted by the error situation. These involved entities relate to relevance evaluation, condition evaluation, operation determination, receiver determination, message assembly, and dispatcher configuration. Regarding relevance evaluation, depending on the Business Object modifications, the system determines which Business Object Nodes are relevant. The relevance evaluation may include relevance conditions as expressions on BO nodes and elements, using the same syntax as ABSL (Advanced Business Script Language).

Regarding condition evaluation, in the case of very big update messages, it could be convenient not to transmit the complete message (aka "Complete Transmission"), but only the parts that have modifications (aka "Delta Transmission"). Sometimes, the determination of the deltas is application specific. In such cases, the developer can specify them as a set of rules (Star Cancel and Change conditions) for each BO Node. These rules are Boolean expressions, using the ABSL syntax. Note that process agents using delta transmission should also support complete transmission for reconciliation requests.

Regarding operation determination, in the case the Service Interface has more than one operation, it is necessary to determine which operation should be called.

Regarding receiver determination, the message receiver (logical address) must be determined, which depends on the use case (for example A2A or B2B) and potentially on the triggering business object.

Regarding message assembly, after determining the parts of the message to be sent, it must be assembled from information of the Business Object and associated elements. For this task, Business Query Language BSA++ may be used, which uses a mapping specification in SADL (Semantic Application Design Language). Partners should be able to create such a SADL specification using a graphical mapping tool.

Regarding dispatcher configuration, depending on the receiver and the use case, different channels must be used, requiring different configurations, message formats (XML, PDF, csv, etc.) and communication protocol (Web Service, e-mail, fax, etc.) Using so-called Message Communication Profiles, the developer may provide "templates" used in configuration time, to create Communication Arrangement objects, containing all necessary configurations.

As mentioned in the Background, many existing systems require code generation and involved entity configuration to be performed manually, which may be contrasted with the operation of step 408 as described above.

At 410, the computer system stores information that associates the error situation (see 406) with the sub-subset of the error messages (see 408) for the business object (see 404). For example, the database server 104 stores the error situation information, associated with its related business object, as controlled by the application server 102 to implement the PaaS development environment.

Example Features and Implementations

As discussed above, a particular PaaS embodiment suitable for implementing embodiments of the present invention is the SAP Business ByDesign environment. The following sections provide additional details regarding the SAP Business ByDesign environment that are also applicable to other PaaS environments.

1 Forward Error Handling

Error and conflict handling deserve a high degree of attention in message-based process integration, because no direct interaction with the user, who initiated the process, can be assumed for solving the problem. Thus the receiver of a message has to handle the problem and trigger appropriate resolution mechanisms. A major part of the work is avoiding error and conflict situations by design, but in most of the cases it is not possible to avoid them entirely. This means that error and conflict situations must also be considered in asynchronous communication with Partner Add-ons.

1.1 Use Cases

Inbound error and conflict handling may be considered in the following cases. First, for internal process integration (A2A), when the receiver is ByDesign Process Component (interaction 220 received by the application server 102b); for example, when a new partner service interface is created at the ByDesign side, or an existing service interface is used at the ByDesign side. Second, for internal process integration (A2A), when the Receiver is a Partner Add-on (interaction 220 received by the application 210); for example, when the Partner Add-on interacts with ByDesign using the request-confirmation pattern, the error handling of the confirmation message is part of the Partner Add-on. Third, for external process integration (B2B, 3rd party A2A) as shown by interaction 222.

1.2 Scope

Regarding the resolution strategies for error handling, the following resolution strategies are supported for Partners: retry, incident, business task management (BTM) task, and notification of failure. Retry is used for temporary errors such as locking errors or temporary unknown reference errors. Incident is used for errors which have to be solved by the service provider or the partner. BTM task is used for errors or conflicts which must be resolved by an end user. Notification of failure (also referred to as request for reconciliation) is used in A2A communication to synchronize sender and receiver.

1.2.1 Resolution Mechanisms

In this section the resolution mechanisms and the usage of the resolution strategies within the Partner Add-ons are described more in detail.

Resolution Incident. The Resolution Incident may be used as the default resolution strategy for all permanent error situations where no explicit resolution strategy is defined. The incidents may be created by the existing health check 17 and sent to the Service Provider. The Service Provider may analyze the incident and forward it to the partner, if the error is ascribed to the Partner Add-on. The health check need not create incidents in partner development and test systems.

Resolution BTM Task. The Resolution Task is used for errors and conflicts which are to be resolved by an end user. The Partner Tools may support one BTM task type per inbound interface. The tasks may be addressed to key users and not to business users. (Business users are the users who interact with the business objects in a direct manner, e.g., to perform data entry; key users provide management and oversight to the business users, may have increased access rights as compared to business users, and may approve extended access rights to business users in certain circumstances (e.g., in response to an error message).)

Resolution Notification of Failure (Request for reconciliation). The resolution strategy may be supported in internal A2A communication and may be triggered from a BTM task. The sender of the message should support reconciliation mode, and the receiver should be able to process reconciliation messages.

1.3 Implementation

In order to support interface specific inbound error handling for an inbound interface, the following prerequisites may be fulfilled. First, the inbound process agent may be able to handle errors in each process agent step. Second, the inbound process agent may implement the agent step PERFORM_ERROR_HANDLING. Third, for the inbound interface an inbound error handling design may be defined. The following sections of this chapter describe these topics in detail.

1.3.1 Error Handling in the Agent Steps

For every error that occurs within the process agent or is passed back from calls to business objects, the agent may decide whether processing should be aborted or continued. If the agent decides to abort processing, it may set the flag OUT_ERROR_OCCURED, forward the error messages to the framework message handler and add a fatal message. The fatal message should describe the error situation and contain the reason why the agent decided to abort processing.

Correct handling of the error messages from the business objects can be achieved by calling the method CL_AP_PROCESS_AGENT_TOOLS=>FORWARD_ESI_MESSAGES after every ESI (enterprise service infrastructure) call. For errors that are detected by the process agent, the agent may create respective error messages (subclasses of CM_SPAF_AGENT_ROOT) and add them to the message handler.

1.3.2 PERFORM_ERROR_HANDLING

This agent step is called, if the agent decided to abort processing in one of the agent steps (see section 1.3.1 Error Handling in the Agent Steps). The agent has to analyze, consolidate and finalize the error messages contained in the message handler, assemble the fault message, provide the ACL (access control list) for the ProcessIntegrationInboundError business object instance, which will be created for the erroneous message, and provide details about the sending and receiving business object instances.

1.3.2.1 Filling of ACL

The ACL has to be provided in the export parameter OUT_ACL of PERFORM_ERROR_HANDLING. Since the BTM tasks created by Partner Add-ons may be addressed to key users, only one ACL item with access context 32 'Internal IT Support' is required (constant IF_AP_ACCESS_CONTEXT_CODE_C=>GC_INTERNAL_IT_SUPPORT).

The Access Group(s) that have access for the access context "Internal IT Support" will be determined based on the Support Area Codes. The codes should be taken from the primary receiving business object and they must be converted to universally unique identifiers (UUIDs). This can be done by calling the method:

CL_ITSAM_SUPPORT_AREA_ACXPROV=> CONVERT_CODE_TO_UUID

For the Support Area Codes the constants provided in interface IF_MDRS_CFG_SUPPORT_AREA_C should be used.

1.3.2.2 Filling of OUT_RECEIVER_BO_INFO and OUT_SENDER_BO_INFO

Filling of sender and receiver business objects may be used for the following topics: visualization of communication errors in the Document Flow, visualization of PAF BTM tasks in the Task Region, visualization of error details in the Communication Error user interface (UI), incident creation in DFV (data flow verification), and visualization of error details in Application Management Work Center.

The information about the sending and receiving business objects may be provided in the exporting parameters OUT_RECEIVER_BO_INFO and OUT_SENDER_BO_INFO, as follows. The sender business object should contain information about the business object instances which triggered the process. The receiver business object should contain information about the business object instances which should be created or updated by the inbound agent.

The parameters may be filled by calling method:

CL_AP_PROCESS_AGENT_BO_INFO=>MAP_BO_INFO and providing IT_SENDER_BO_INFO and IT_RECEIVER_BO_INFO as follows:

IT_SENDER_BO_INFO

The sender business object instances may be filled based on the data which is available in the message payload. It need not be filled for external communication (e.g. 3rd Party/B2B).

Per entry the following information may be provided:

BO_NODE_REFERENCE-UUID-UUID of the sender business object

BO_NODE_REFERENCE-FORMATTED_ID—ID of the sender business object (Formatted ID/BTD ID or special business object ID)

BO_NODE_REFERENCE-OBJECT_TYPE_CODE-Object Type Code (OTC) of the sender business object BO_NODE_REFERENCE-OBJECT_NODE_TYPE_CODE—Object Node Type Code (ONTC) of the sender business object BO_NODE_REFERENCE-OBJECT_TYPE_CODE and BO_NODE_REFERENCE-OBJECT_NODE_TYPE_CODE are always mandatory. If they are not provided, a fatal exception will be thrown.

Only the root node entry may be provided for each sender business object, as the root node is the relevant node for selection and visualization. Providing information for subnodes is not necessary.

IT_RECEIVER_BO_INFO

The receiver business object instances may be filled based on the data collected in the inbound agent. For each business object to be updated by the inbound agent, one entry needs to be created.

Per entry the following information must be provided:
BO_NODE_REFERENCE-UUID—UUID of the receiver business object
BO_NODE_REFERENCE-FORMATTED_ID—ID of the receiver business object (Formatted ID/BTD ID or special business object ID)
BO_NODE_REFERENCE-OBJECT_TYPE_CODE—Object Type Code (OTC) of the receiver business object
BO_NODE_REFERENCE-OBJECT_NODE_TYPE_CODE—Object Node Type Code (ONTC) of the receiver business object
BO_ROOT_NODE_ID—Root Node ID of the referenced receiver business object
BO_NODE_ID—Node ID of the receiver business object-needs to be initial for root nodes For each business object type which should be created by the inbound agent (or if the document cannot be identified due to a wrong ID), one entry needs to be created. Per entry provide BO_NODE_REFERENCE-OBJECT_TYPE_CODE—Object Type Code (OTC) of the receiver business object (using IF_AP_OBJECT_TYPE_CODE_C if OTC is not available in the payload) and BO_NODE_REFERENCE-OBJECT_NODE_TYPE_CODE—Object Node Type Code (ONTC) of the receiver business object BO_NODE_REFERENCE-OBJECT_TYPE_CODE and BO_NODE_REFERENCE-OBJECT_NODE_TYPE_CODE may be mandatory in certain embodiments. If they are not provided, a fatal exception may be thrown.

Only the root node entry is required for each receiver business object, as the root node is the relevant node for selection and visualization. Providing information for subnodes is not necessary.

1.3.2.3 OUT_BO_SEQ_INFO

In order to ensure automatic termination of preceding erroneous messages, outdated by reconciliation messages, the inbound agent needs to provide information about the sequence context and key. This may be done by filling output parameter OUT_BO_SEQ_INFO.

Two modes are supported for the termination of outdated messages: restart and cancel. The default termination mode is restart, which means that outdated messages will be restarted, if a respective reconciliation message has been processed. However it is recommended to use the termination mode cancel whenever possible. This is achieved by calling method CANCEL_OUTDATED_MESSAGES, located at the receiving business document (RBD), which is provided to the process agent implementation within framework method INIT. Termination mode cancel is not possible if the original message contains more than one sequence context (complex sequencing) or the business object root node ID (sequencing based on a single business object instance) is not available.

The following rules apply. First, when complex sequencing contexts are used, the affected sequence context codes and keys may be provided. Second, in case of sequencing based on a single business object instance the affected business object proxy name and the root node ID may be provided. Third, if initial creation failed and therefore no business object root node ID is available, only the business object proxy name has to be provided. Fourth, in addition the corresponding reconciliation counter may be provided.

1.3.2.4 Error Messages

The changing parameter IN_MESSAGE_LIST contains the list of all error messages, which were raised during agent processing. The agent has to rework this list, i.e. delete, replace and/or add new messages and ensure that one of the messages is marked as fatal message (IN_MESSAGE_LIST-FATAL_ERROR). The message which is marked as fatal message should describe the error situation and contain the reason, why the agent could not process the XML message. The other messages should contain further details about the error situation and should help the end user (resolution BTM task) or the support to identify and to resolve the error. If the error situation is addressed to an end user via BTM task, further prerequisites must be fulfilled, which are described in section 1.3.3.4 BTM Instruction Text.

1.3.2.5 Fault Message (OUT_EXCEPTION)

In case of errors the inbound agent must create a fault message which needs to be provided via output parameter OUT_EXCEPTION. The fault message can be created by using the generic method CREATE_FAULT_MESSAGE of class CL_AP_PROCESS_AGENT_TOOLS. The method requires the input parameters IN_WF_TRIGGERED, IN_AUTOMATIC_RETRY and IN_MESSAGE_LIST and returns the fault message in output parameter OUT_EXCEPTION. It must be ensured that the list of error messages is finalized as described in section 1.3.2.4 Error Messages.

1.3.3 Inbound Error Handling Design

In order to support interface specific inbound error handling for an inbound interface, it is required to define an error handling rule group in transaction SPAF_ERH_DESIGN. The rule group defines on level of the symptom, how error situations are handled. If no rule group is defined for an interface, all permanent error situations will result in an incident.

In the rule group, error handling rules may be defined for each error symptom. The error handling rule itself contains the error handling resolution strategy which is applied to an error situation, handled by this rule. For resolution BTM Task several other objects may be defined, like a PAF task type, a BTM task type, etc.

Figure 5:
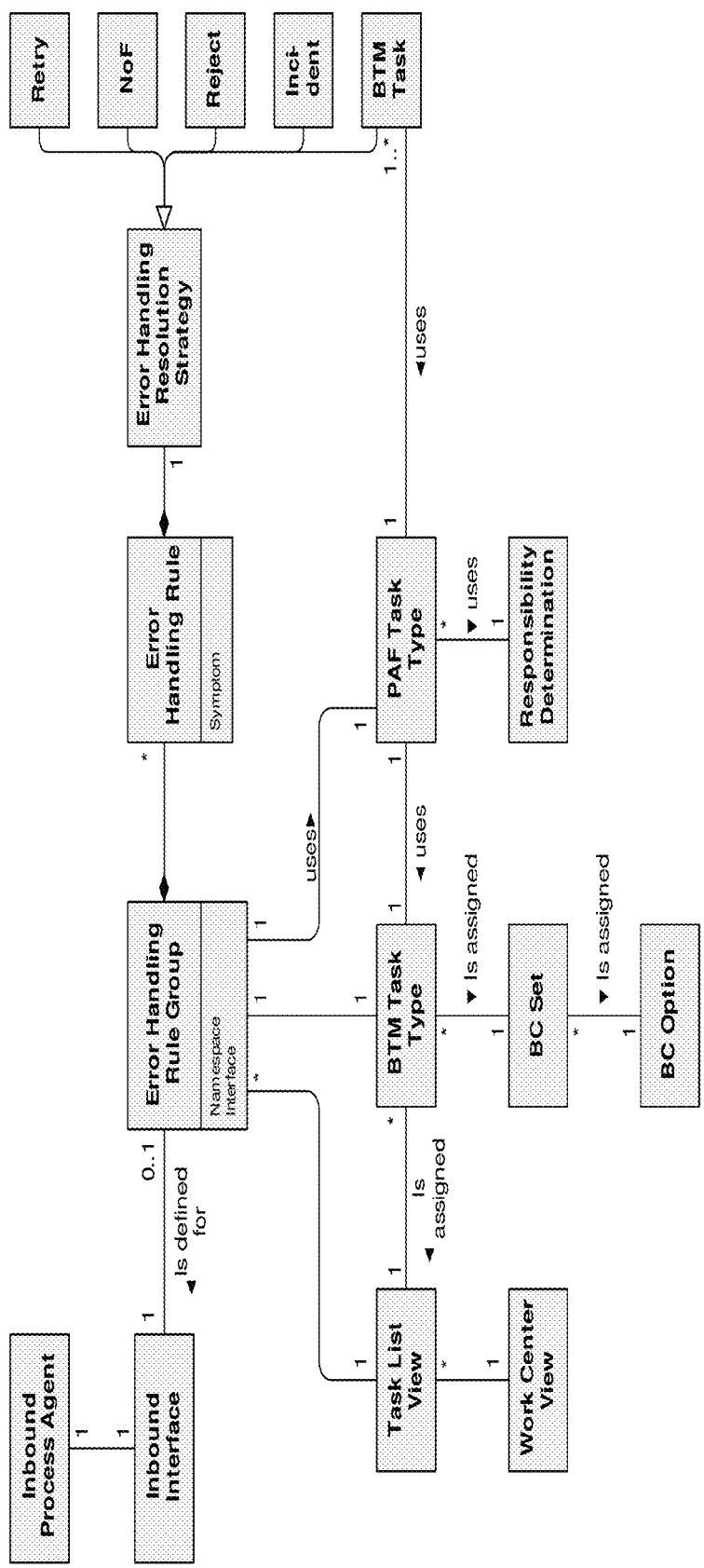
FIG. 5 is a diagram in universal modeling language (UML) format that illustrates inbound error handling design.

FIG. 5 is a diagram in universal modeling language (UML) format that illustrates inbound error handling design.

When creating inbound interfaces with the Partner Tools, the error handling rule group will be generated automatically, with the following rules in TABLE 1:

TABLE 1

| Symptom | Symptom Code | Resolution |
| --- | --- | --- |
| Configuration inconsistency | INC.COI | Task |
| Configuration mismatch | ENV.COM | Task |
| Configuration unknown | ENV.COM.COU | Task |
| Business object inconsistency | INC.BOI | Task |
| Cross business object mismatch | ENV.CBM | Task |
| Business object reference unknown | ENV.CBM.BRU | Task |
| Permanent unknown business object reference | BPR.PUR | Task |
| Permanent lock | BPR.PEL | Task |
| Service call does not fit with state of data in BO | SBM.SBM | Task |
| Service contract violation | SEL.SCV | Task |

All other symptoms are covered by the generic rule group, which is defined in ByDesign for all interfaces and contains the following rules in TABLE 2:

TABLE 2

| Symptom | Symptom Code | Resolution |
|---|---|---|
| Temporary lock | BPT.TEL | Retry |
| Temporary unknown business object reference | BPR.TUR | Retry |
| Temporary unavailable service provider | BPR.TUS | Retry |
| Foreign lock | FOL.FOL | Incident |
| Missing authority | MIA.MIA | Incident |
| Failed service invocation | SEI.FSI | Incident |
| Failed synchronous service call | SEI.FSI.FSS | Incident |

For all rules having resolution task, a PAF task type and a BTM task type are required, which may be generated by the Partner Tools.

Remark: The resolution Task does not mean that all error situations, raising a fatal message with these symptoms, are really handled by a BTM task. The configuration of resolution Task in the rule is a necessary condition but there are further prerequisites that must be fulfilled before task is applied as resolutions strategy (see also section 1.3.3.4 BTM Instruction Text).

1.3.3.1 PAF task type

For each inbound interface the Partner Tools will create exactly one PAF task type, according to an embodiment. The PAF task type defines the BTM task type which will be used for the tasks, the responsibility determination which is used for the determination of the responsible agent of the BTM task, and the resolution strategies which are allowed for the resolution of the error situation (e.g. Restart or Request for Reconciliation).

Most of the information that is required for the creation of the PAF task type is predetermined and only little input is required from the developer of the Partner Add-on. The developer must only specify the resolution strategies which can be triggered by an end user, if the error is addressed to him via BTM task. The following resolution strategies are possible:

Restart (default=enabled)
Mass restart (default=disabled)
Cancel: In A2A communication the cancellation of messages should only be allowed in exceptional cases since it normally leads to inconsistencies between sender and receiver and manual follow-up activities are required (default=disabled)
Notification of Failure (Request for reconciliation): only in A2A communication to synchronize sender and receiver. The sender of the message must support reconciliation mode and the receiver must be able to process reconciliation messages (default=disabled)
Display payload (default=disabled)
Change payload (default=disabled, only possible in external communication)

On basis of this input and the information listed below, the Partner Tools can create the PAF task type, including the namespace and name of the inbound interface, the name of the BTM task type to be used (see section 1.3.3.3 BTM Task Type), and the name of the ABAP class used for responsibility determination (see section 1.3.3.2 Responsibility Determination).

The name of the PAF task type should follow the naming convention <prefix><hash key>, whereby:

<prefix>: ABAP-namespace for the partner development, e.g. /CIB/. It is derived from the partner project and cannot be changed by the developer.

<hash key>: A hash key that is generated by the Partner Tools 1.3.3.2 Responsibility Determination Since the BTM tasks for inbound error handling may only be addressed to key users, it is sufficient to provide one generic class for responsibility determination, which is used in all PAF task types created by partners. The class has to implement method DETERMINE_RESPONSIBILITY of interface IF_SPAF_ERROR_TASK_DETERM_RESP and call method:
CL_AP_PROCESS_AGENT_TOOLS_BTM=>GET_RESPONSIBLE_KEY_USERS.

The method requires the Support Area Codes as input parameter, which is mandatory. The codes can be derived from the ACL, which was supplied by the inbound process agent in PERFORM_ERROR_HANDLING (see section 1.3.2.1 Filling of ACL) and is provided as input parameter IN_ACL_ENTRIES of method DETERMINE_RESPONSIBILITY. The ACL contains the UUIDs of the Support Area Codes which must be converted into the respective codes by using CL_MDRS_SUPP_AREA_HELPER=>GET_CODE_FROM_UUID 1.3.3.3 BTM Task Type In addition to the PAF task type the Partner Tools must generate a corresponding BTM task type. The BTM task type should be created with the same name as the PAF task type (see section 1.3.3.1 PAF task type) and use the following properties:

Task Category=Business Task
Usage Type=Inbound Error Handling
Reference BO name='SPAF_TECHNICAL_ERROR_BO'
Reference BO node name='ROOT'
Singleton indicator is set
ACL creation mode is set as 'Copy ACL from Reference BO'
Task priority is set to 'High'
Support area codes are empty
Responsibility determination is empty
The task must have two technical parameters which are required for the determination of the instruction text of the task
Parameter TP_Message_ID:
Element=TP_Message_ID
Name=TP Message ID
Short Description=Technical Parameter to Determine Instruction Text of Task: Message ID
ABAP Dictionary Data Type-Type Name=SESF_BO_NODE_ID
In tab 'Properties' activate flag 'Import' in the section 'Parameter Settings'.
Parameter TP_Log_Item_Node_ID:
Element=TP_Log_Item_Node_ID
Name=TP Log Item Node ID
Short Description=Technical Parameter to Determine Instruction Text of Task: Log Items
ABAP Dictionary Data Type-Type Name=SESF_BO_NODE_ID_TAB
In tab 'Properties' activate flag 'Import' in the section 'Parameter Settings'.
The parameter binding of the two parameters must be defined as follows:
Parameter TP_Message_ID:
Source Data Context=&REF_BO_NODE._NODE_DATA.NODE_ID&
Task Parameters=&TP_MESSAGE_ID&

Parameter TP_Log_Item_Node_ID:
Source Data Context=&REF_BO_NODE.LOG_ITEM[ ]._NODE_DATA.NODE_ID&
Task Parameters=&TP_LOG_ITEM_NODE_ID&

For the standard text/instruction text the following complex expression is mandatory: % CL_AP_PROCESS_AGENT_TOOLS_BTM.GET_TASK_INSTRUCTION_TEXT(IV_MESSAGE_ID=&TP_MESSAGE_ID&, IT_LOG_ITEM_NODE_ID=&TP_LOG_ITEM_NODE_ID&) %

The only attribute which is task type specific is the title of the task. The title will be generated by the Partner Tools on basis of the following guideline:
Solve Issue in <Receiver BO Name> to Process <Description Inbound Interface> Sent by <Sender BO Name>
<Receiver BO name>: The name of the receiver business object (e.g. Purchase Order or Sales Order). The name should be derived from the code list of the GDT ObjectTypeCode and should not include technical BOs without UI relevance
<Description Inbound Interface>: Descriptive text of the inbound interface
<Sender BO name>: The name of the sender business object derived from the name from the code list of the GDT ObjectTypeCode 1.3.3.3.1 Task Agent For the inbound error handling BTM task types a task agent is not required, since they are handled by a generic task agent.

1.3.3.3.2 BC Sets

In the partner development environment the corresponding BC set for a task type and the BC option must be created by the editor implicitly. For inbound error handing task types the BC set must be created with the following attributes:
Task Type Human Readable ID: to be taken from the BTM task type
Identifier For Process: Must be defined according to the concept papers of BTM and BC for partner development.
Task is mandatory=X
Task Agent Active Flag=X
All other attributes like 'Deletable', 'Task Category', 'Default Priority of BTM task', deadlines and reactions, 'Help text for task type' and 'Task title' must be empty.

In the Business Option it must be ensured that all assigned the BC sets are not fine tuning enabled. This is required since the error handling task types cannot be modified by customers. Since it is not allowed to have both, fine tuning enabled and fine tuning disabled task types in the same Business Option, the tools must create an own Business Option for the BTM task types for inbound error handling.

1.3.3.3.3 Task List View

Since the error handling BTM tasks that are created by Partner Add-ons may be addressed to key users, it is sufficient to create one task list view for all task types of a deployment unit. All such task list views must be assigned to the Application and User Management Work Center View and have the following attributes: "Appearance=Control Center" and "Operation=Execute".

BTM may provide APIs that allow developers to create, maintain and delete task list views; to assign task types to a task list view or to remove task types from a task list view; and to assign a task list view to the Application and User Management Work Center View.

1.3.3.4 BTM Instruction Text

Although resolution Task is configured for several error symptoms, not all error situations raising a fatal message with these symptoms will automatically lead to a BTM task (see also section 1.3.3 Inbound Error Handling Design). The fatal message must fulfill further prerequisites, so that a task is created. The reason for these prerequisites is that it must be ensured by design that the tasks addressed to end users are resolvable and that the end users get detailed and understandable instructions about resolving the error situation. Since the instructions depend strongly on the concrete error situation, it was decided to use the long text of the fatal message as instruction text.

Figure 6:
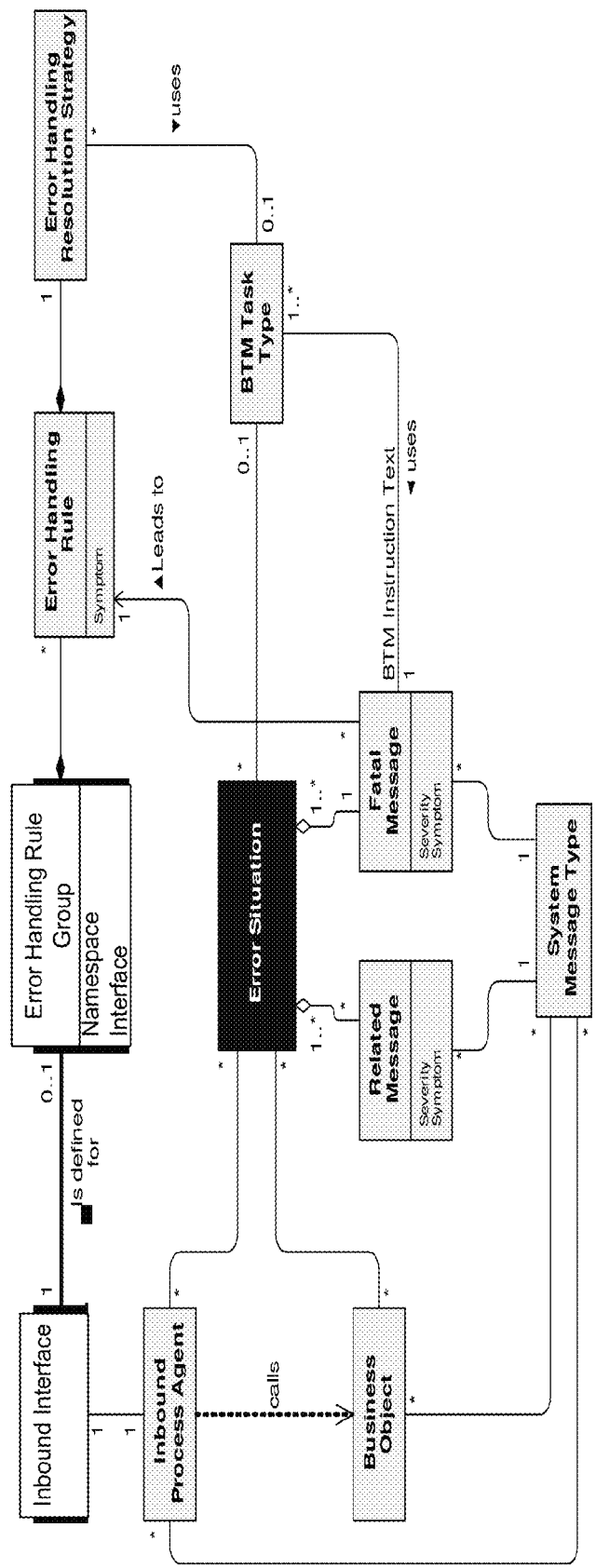
FIG. 6 illustrates the relationship between the error situations which can occur in the process agent or the business objects, the fatal message, the error handling rules and the BTM task.

FIG. 6 illustrates the relationship between the error situations which can occur in the process agent or the business objects, the fatal message, the error handling rules and the BTM task. Therefore the fatal message must fulfill the following conditions for resolution Task:

The T100 message of the fatal message must have a long text defined. The long text is used in the BTM task and in the Communication Error UI as instruction text The T100 message must belong to a message class (SE91) which only contains T100 messages defined for BTM tasks.

The CM class, used by the fatal message, must be a subclass of CM_SPAF_AGENT_TASK_ROOT. It is recommended to use an own CM class per inbound process agent.

The corresponding system message type group must be classified as 'BTM Instructions' and can only be used by process agents.

The system message type group must only contain system message types defined for BTM tasks The terminology in the T100 long texts must be aligned with the terminology used in the Communication Error UI The content of the T100 long text must be aligned with the configuration of the actions of the corresponding PAF task type (see section 1.3.3.1 PAF task type), i.e. actions which are not enabled in the PAF task type should not be mentioned in the text (e.g.: in the PAF task type the resolution 'Cancel' is disabled but in the long text it is described that the user shall cancel the message)

Since the BTM task UI and the Communication Error UI currently only support line breaks, the development tools must ensure that no other formatting than line break is used in the long texts of the T100 messages (see also guideline Standards for Message Long Texts Used in PAF BTM Task Descriptions).

The T100 long text should contain a detailed description of the error situation and list the different solutions and the steps which are required to solve the error (see also guideline Standards for Message Long Texts Used in PAF BTM Task Descriptions).

Figure 7:
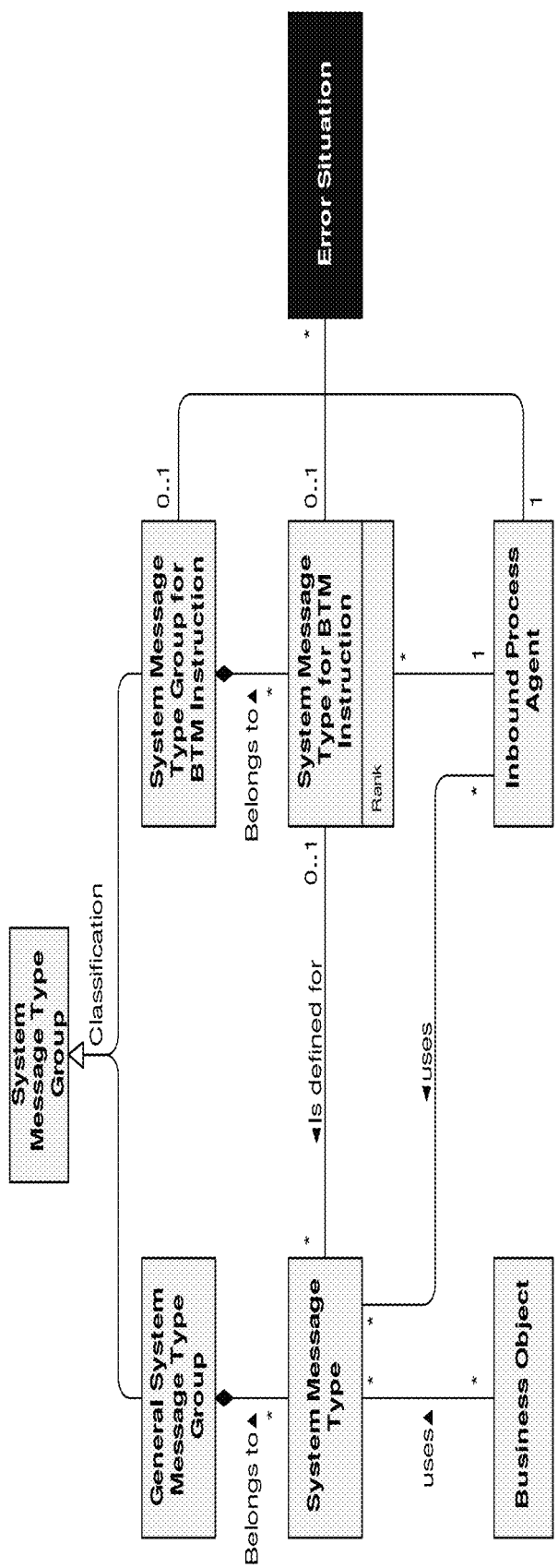
FIG. 7 illustrates the relationship between the error situation and system message type defined for BTM instruction text.

FIG. 7 illustrates the relationship between the error situation and system message type defined for BTM instruction text. In order to support resolution Task by Partner Add-ons, the Partner Tools may offer the developers the capability to define T100 messages for BTM tasks and to assign the messages to specific error situations. At runtime the process agent must identify the error situation and add the assigned error message for the BTM task as fatal message to the message handler. This is achieved by the following steps:

At design time the tools must determine all system message types assigned to the process agent and the business objects, called by the process agent On basis of these system message types the partner developer must select all messages which shall be resolved by BTM task For each of the selected message types the developer must define respective "BTM messages" with long text (=System Message Type for BTM Instruction). If the selected message type uses message variables, it must be ensured that the variables of the selected message type are mapped to respective variables of the BTM message type. The tools must ensure that the texts are created according to the guideline Standards for Message Long Texts Used in PAF BTM Task Descriptions Afterwards the developer must define an order of the BTM message types. This order is considered at runtime in PERFORM_ERROR_HANDLING, when the agent evaluates the error messages contained in the message handler.

If an error occurs during inbound processing, PERFORM_ERROR_HANDLING is called and the agent must check for all messages in the message handler, whether a corresponding BTM message was defined. If so, the process agent must determine the BTM message with the highest order and add it as fatal message to the message handler. The long text of the so determined BTM message will be used as instruction text and displayed in the BTM task and on the Communication Error UI.

Note that for errors that occurred because of locking issues, a generic T100 message with a generic long text is provided (CM class CM_AP_PROCESS_AGENT_TOOLS_BTM, message class AP_PAF_TOOLS_BTM, message 000). However it is also possible to provide a more specific error message, if desired.

Figure 8:
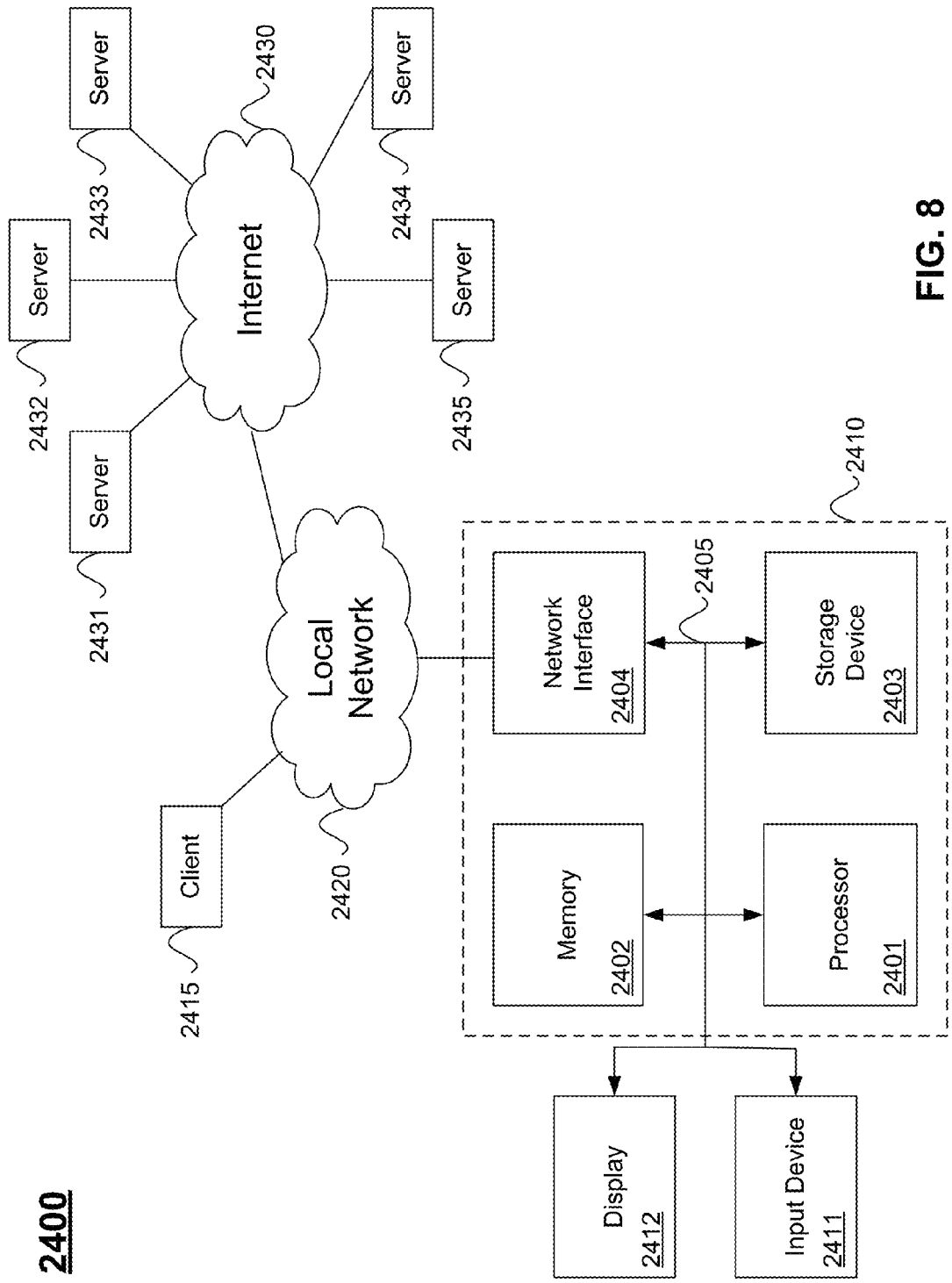
FIG. 8 is a block diagram of an example computer system and network 2400 for implementing embodiments of the present invention.

FIG. 8 is a block diagram of an example computer system and network 2400 for implementing embodiments of the present invention. Computer system 2410 includes a bus 2405 or other communication mechanism for communicating information, and a processor 2401 coupled with bus 2405 for processing information. Computer system 2410 also includes a memory 2402 coupled to bus 2405 for storing information and instructions to be executed by processor 2401, including information and instructions for performing the techniques described above. This memory may also be used for storing temporary variables or other intermediate information during execution of instructions to be executed by processor 2401. Possible implementations of this memory may be, but are not limited to, random access memory (RAM), read only memory (ROM) (when not storing temporary variables or other intermediate information), or both. A storage device 2403 is also provided for storing information and instructions. Common forms of storage devices include, for example, a hard drive, a magnetic disk, an optical disk, a CD-ROM, a DVD, a flash memory, a USB memory card, a solid state drive, or any other medium from which a computer can read. Storage device 2403 may store source code, binary code, or software files for performing the techniques or embodying the constructs above, for example.

Computer system 2410 may be coupled via bus 2405 to a display 2412, such as a cathode ray tube (CRT) or liquid crystal display (LCD), for displaying information to a computer user. An input device 2411 such as a keyboard and/or mouse is coupled to bus 2405 for communicating information and command selections from the user to processor 2401. The combination of these components allows the user to communicate with the system. In some systems, bus 2405 may be divided into multiple specialized buses.

Computer system 2410 also includes a network interface 2404 coupled with bus 2405. Network interface 2404 may provide two-way data communication between computer system 2410 and the local network 2420. The network interface 2404 may be a digital subscriber line (DSL) or a modem to provide data communication connection over a telephone line, for example. Another example of the network interface is a local area network (LAN) card to provide a data communication connection to a compatible LAN. Wireless links is also another example. In any such implementation, network interface 2404 sends and receives electrical, electromagnetic, or optical signals that carry digital data streams representing various types of information.

Computer system 2410 can send and receive information, including messages or other interface actions, through the network interface 2404 to an Intranet or the Internet 2430. In the Internet example, software components or services may reside on multiple different computer systems 2410 or servers 2431, 2432, 2433, 2434 and 2435 across the network. A server 2431 may transmit actions or messages from one component, through Internet 2430, local network 2420, and network interface 2404 to a component on computer system 2410.

The computer system and network 2400 may be configured in a client server manner. For example, the computer system 2410 may implement a server. The client 2415 may include components similar to those of the computer system 2410.

More specifically, as described above, the computer system 2410 may implement the application server 102. Alternatively, the servers 2431 and 2432 may implement the internal system 202, which implements the application server 102. The server 2432 may implement the database server 104. The client 2415 may implement the developer client 106. Another client (not shown) may implement the user client 108.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A computer-implemented method of improving error handling in a development environment created by a platform provider in which a third party developer develops applications for use by customers, comprising:
   storing a plurality of business objects and a plurality of error messages, wherein a set of the plurality of business objects are building blocks that form an application in the development environment, wherein the application is executable in a runtime environment, wherein the plurality of error messages are associated with the plurality of business objects, and wherein the plurality of error messages corresponds to potential errors during run time processing of the plurality of business objects;
   displaying, in a graphical environment, a business object of the plurality of business objects and a subset of the plurality of error messages, wherein the subset is related to the business object;
   receiving a first user input regarding an error situation, wherein the error situation includes a resolution of the error situation;
   receiving a second user input, in the graphical environment, that associates the error situation with a sub-subset of the subset of the plurality of error messages; and
   storing information that associates the error situation with the sub-subset for the business object.

2. The method of claim 1, further comprising:
   automatically generating, by the development environment, code that relates the error situation with the sub-subset of the subset of the plurality of error messages.

3. The method of claim 1, further comprising:
   automatically accessing, by the development environment, a plurality of entities that relates the error situation with the sub-subset of the subset of the plurality of error messages.

4. The method of claim 1, wherein the information that associates the error situation with the sub-subset for the business object is stored during a design time, further comprising:
- performing runtime processing of the business object that results in an error; and
- resolving the error according to the error situation.

5. The method of claim 1, wherein the information that associates the error situation with the sub-subset for the business object is stored during a design time in the development environment, further comprising:
- exiting the development environment;
- entering the runtime environment;
- performing runtime processing, in the runtime environment, of the business object that results in an error; and
- resolving the error according to the error situation.

6. The method of claim 1, further comprising:
- displaying a second business object and a second subset of the plurality of error messages, wherein the second subset differs from the subset;
- receiving a third user input that associates the error situation with a second sub-subset of the second subset of the plurality of error messages.

7. The method of claim 1, wherein the error situation is one of a plurality of error situations, wherein the first user input includes selecting the error situation from the plurality of error situations.

8. The method of claim 1, wherein the first user input corresponds to a plurality of first user input that creates a plurality of error situations.

9. The method of claim 1, wherein the second user input corresponds to dragging and dropping the sub-subset to associate the sub-subset with the error situation.

10. The method of claim 1, wherein the sub-subset includes two or more error messages that are resolved by the error situation.

11. A system for improving error handling in a development environment created by a platform provider in which a third party developer develops applications for use by customers, comprising:
- an application system that is configured to implement the development environment;
- a database system that is configured to store a plurality of business objects and a plurality of error messages, wherein a set of the plurality of business objects are building blocks that form an application in the development environment, wherein the application is executable in a runtime environment, wherein the plurality of error messages are associated with the plurality of business objects, and wherein the plurality of error messages corresponds to potential errors during run time processing of the plurality of business objects; and
- a development client system that is configured to interact with the application system to display, in a graphical environment, a business object of the plurality of business objects and a subset of the plurality of error messages, wherein the subset is related to the business object,
- wherein the development client system is configured to receive a first user input regarding an error situation, wherein the error situation includes a resolution of the error situation,
- wherein the development client system is configured to receive a second user input, in the graphical environment, that associates the error situation with a sub-subset of the subset of the plurality of error messages, and
- wherein the database system is configured to interact with the application system to store information that associates the error situation with the sub-subset for the business object.

12. The system of claim 11, wherein the application system is configured to automatically generate code that relates the error situation with the sub-subset of the subset of the plurality of error messages.

13. The system of claim 11, wherein the application system is configured to automatically access a plurality of entities that relates the error situation with the sub-subset of the subset of the plurality of error messages.

14. The system of claim 11, wherein the application system is configured to exit the development environment, to implement the runtime environment, and to enter the runtime environment;
- wherein the application system is configured to perform runtime processing of the business object that results in an error; and
- wherein the application system is configured to interact with a user client system to resolve the error according to the error situation.

15. The system of claim 11, wherein the second user input corresponds to dragging and dropping the sub-subset to associate the sub-subset with the error situation.

16. A non-transitory computer readable medium storing instructions to control a computer system for improving error handling in a development environment created by a platform provider in which a third party developer develops applications for use by customers, comprising:
- an application component that is configured to control an application system to implement the development environment;
- a database component that is configured to control a database system to store a plurality of business objects and a plurality of error messages, wherein a set of the plurality of business objects are building blocks that form an application in the development environment, wherein the application is executable in a runtime environment, wherein the plurality of error messages are associated with the plurality of business objects, and wherein the plurality of error messages corresponds to potential errors during run time processing of the plurality of business objects; and
- a development client component that is configured to control a development client to interact with the application system to display, in a graphical environment, a business object of the plurality of business objects and a subset of the plurality of error messages, wherein the subset is related to the business object,
- wherein the development client component is configured to control the development client to receive a first user input regarding an error situation, wherein the error situation includes a resolution of the error situation,
- wherein the development client component is configured to control the development client to receive a second user input, in the graphical environment, that associates the error situation with a sub-subset of the subset of the plurality of error messages, and
- wherein the database component is configured to control the database system to interact with the application system to store information that associates the error situation with the sub-subset for the business object.

17. The non-transitory computer readable medium of claim 16, wherein the application component is configured to control the application system to automatically generate code that relates the error situation with the sub-subset of the subset of the plurality of error messages.

18. The non-transitory computer readable medium of claim 16, wherein the application component is configured to control the application system to automatically access a plurality of entities that relates the error situation with the sub-subset of the subset of the plurality of error messages.

19. The non-transitory computer readable medium of claim 16, wherein the application component is configured to control the application system to exit the development environment, to implement the runtime environment, and to enter the runtime environment;
  wherein the application component is configured to control the application system to perform runtime processing of the business object that results in an error; and
  wherein the application component is configured to control the application system to interact with a user client system to resolve the error according to the error situation.

20. The non-transitory computer readable medium of claim 16, wherein the second user input corresponds to dragging and dropping the sub-subset to associate the sub-subset with the error situation.

21. The system of claim 11, wherein the information that associates the error situation with the sub-subset for the business object is stored during a design time;
  wherein the application system is configured to perform runtime processing of the business object that results in an error; and
  wherein the application system is configured to resolve the error according to the error situation.

22. The system of claim 11, wherein the development client system is configured to display a second business object and a second subset of the plurality of error messages, wherein the second subset differs from the subset; and
  wherein the development client system is configured to receive a third user input that associates the error situation with a second sub-subset of the second subset of the plurality of error messages.

23. The system of claim 11, wherein the error situation is one of a plurality of error situations, wherein the first user input includes selecting the error situation from the plurality of error situations.

24. The system of claim 11, wherein the first user input corresponds to a plurality of first user input that creates a plurality of error situations.

25. The system of claim 11, wherein the sub-subset includes two or more error messages that are resolved by the error situation.

26. The non-transitory computer readable medium of claim 16, wherein the information that associates the error situation with the sub-subset for the business object is stored during a design time;
  wherein the application component is configured to control the application system to perform runtime processing of the business object that results in an error; and
  wherein the application component is configured to control the application system to perform to resolve the error according to the error situation.

27. The non-transitory computer readable medium of claim 16, wherein the development client component is configured to control the development client to display a second business object and a second subset of the plurality of error messages, wherein the second subset differs from the subset; and
  wherein the development client component is configured to control the development client to receive a third user input that associates the error situation with a second sub-subset of the second subset of the plurality of error messages.

28. The non-transitory computer readable medium of claim 16, wherein the error situation is one of a plurality of error situations, wherein the first user input includes selecting the error situation from the plurality of error situations.

29. The non-transitory computer readable medium of claim 16, wherein the first user input corresponds to a plurality of first user input that creates a plurality of error situations.

30. The non-transitory computer readable medium of claim 16, wherein the sub-subset includes two or more error messages that are resolved by the error situation.

* * * * *